United States Patent
Penttinen et al.

(10) Patent No.: US 7,344,759 B2
(45) Date of Patent: Mar. 18, 2008

(54) METHOD FOR MANUFACTURING HEAT-SEALABLE PACKAGING MATERIAL HAVING BARRIER LAYER; CONTAINING CYCLOOLEFIN COPOLYMER

(75) Inventors: Tapani Penttinen, Huutjärvi (FI); Kimmo Nevalainen, Karhula (FI); Jalliina Järvinen, Lahti (FI)

(73) Assignee: Stora Enso Oyj, Helsinki (FI)

( * ) Notice: Subject to any disclaimer, the term of this patent is extended or adjusted under 35 U.S.C. 154(b) by 284 days.

(21) Appl. No.: 10/479,367

(22) PCT Filed: Jun. 27, 2002

(86) PCT No.: PCT/FI02/00568

§ 371 (c)(1), (2), (4) Date: Jan. 13, 2004

(87) PCT Pub. No.: WO03/002343

PCT Pub. Date: Jan. 9, 2003

(65) Prior Publication Data

US 2004/0157516 A1    Aug. 12, 2004

(30) Foreign Application Priority Data

Jun. 28, 2001    (FI) .................................. 20011388

(51) Int. Cl.
*B05D 7/04* (2006.01)
*B05D 1/36* (2006.01)
*B32B 27/10* (2006.01)
*B32B 27/32* (2006.01)
*B65D 65/40* (2006.01)

(52) U.S. Cl. .................... 427/407.1; 427/209; 427/411

(58) Field of Classification Search ................ 427/209, 427/402, 407.1, 411, 412, 412.3
See application file for complete search history.

(56) References Cited

U.S. PATENT DOCUMENTS 4,888,222 A * 12/1989 Gibbons et al. ............ 428/34.2
5,712,006 A * 1/1998 Marano et al. ............. 428/34.2
5,840,385 A * 11/1998 Penttinen et al. .......... 428/36.7
6,068,936 A * 5/2000 Peiffer et al. ................ 428/500
6,071,576 A * 6/2000 Bentmar et al. ........... 428/34.2
6,921,563 B2 * 7/2005 Goerlitz et al. ............ 428/34.2
2002/0160135 A1* 10/2002 Christopherson et al. .. 428/35.7
2003/0180487 A1* 9/2003 Reighard et al. .......... 428/34.2

FOREIGN PATENT DOCUMENTS

| AU | 2001-69441 A | 1/2002 |
| EP | 0 687 557 A2 | 12/1995 |
| EP | 0773102 A1 | 5/1997 |
| EP | 1174262 A1 | 1/2002 |
| FI | 89567 B | 7/1993 |
| FI | 104887 B | 6/1994 |
| FI | 106008 B | 11/2000 |
| JP | 8-134800 A | 5/1996 |
| JP | 08-134800 A * | 5/1996 |
| WO | WO 98/03332 A1 * | 1/1998 |

* cited by examiner

*Primary Examiner*—William Phillip Fletcher, III
(74) *Attorney, Agent, or Firm*—Birch, Stewart, Kolasch & Birch, LLP

(57) ABSTRACT

Method of manufacturing polymer-coated heat-sealable packaging material and sealed packages (e.g., carton, box, or bag packages for dry and liquid foods). The material includes a fiber base of packaging paper or packaging board, an outer polymeric heat sealing layer such as LDPE, and an inner polymeric water vapor barrier layer which is partly or totally formed of an amorphous cycloolefin copolymer. In the method, the cycloolefin copolymer water vapor barrier and the heat sealing layers are brought onto the fiber base by an extrusion step, and in accordance with the manufacturing method, they can be placed on one side of the fiber base or on both sides of the fiber base for achieving a moisture barrier on both sides of the package. Also, polymeric oxygen barrier layers, such as EVOH or polyamide layers, can be incorporated into the packaging material. By using the cycloolefin copolymer as an extruded water vapor barrier layer, curling of the packaging material is prevented.

25 Claims, 4 Drawing Sheets

Figure 1:
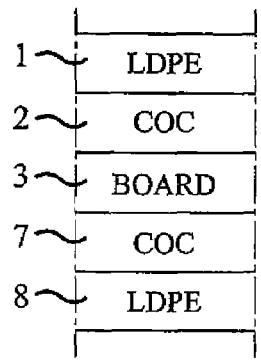

METHOD FOR MANUFACTURING HEAT-SEALABLE PACKAGING MATERIAL HAVING BARRIER LAYER; CONTAINING CYCLOOLEFIN COPOLYMER

The invention relates to a method for manufacturing a heat-sealable packaging material, in which superimposed polymeric coating layers are extruded onto a fibre base, the layers comprising an outer polymeric heat sealing layer and at least one inner polymeric barrier layer, the water vapour permeability of which is lower than that of the heat sealing layer. Further, the invention relates to a polymer-coated packaging material provided by the method and to a finished, sealed package manufactured of it by folding and heat sealing.

Tightness is required from the product packages for liquid and even many dry foods both for preventing the premature deterioration of the product and also to protect the packaging material itself. The water vapour tightness of the material prevents the liquid product from leaking from the package and the fibre base of the material from becoming water-soaked due to the moisture absorbing from the product. The water vapour tightness also prevents the access of external moisture to damage the packed dry product. In addition, it is often required that the packaging material be oxygen tight to-prevent the oxidation of the packed product and to preserve its aromas.

The low-density polyethylene (LDPE) generally used in the uppermost heat sealing layer of fibre-based polymer-coated packaging materials also gives protection against the permeation of water vapour. However, LPDE is not a very efficient material in this respect, and for achieving a good water vapour barrier it has to be used as a relatively thick layer. High-density polyethylene (HDPE) is used in fibre-based packaging materials as a considerably more efficient polymer forming the water vapour barrier, the layer containing HDPE being typically placed inside the packaging between the heat sealing layer and the fibre base and the possible oxygen barrier layer so that, besides the fibre base, the water vapour barrier also protects the oxygen barrier from moistening caused by the packed product.

However, the drawback of the use of HDPE in fibre-based packaging materials has been the curling of the material caused by it. The reason for this is the postcrystallization taking place in the HDPE layer after its extrusion.

The object of the invention is to form a solution, with which the said curling problem of the fibre-based packaging material can be avoided without it being necessary to compromise over the water vapour barrier arranged to the material. It is characteristic of the manufacturing method of the packaging material of the teristic of the manufacturing method of the packaging material of the invention that cycloolefin copolymer (COC) is incorporated in the barrier layer so that the extrusion produces an amorphous layer without the post-crystallization occurring in the polymer.

Cycloolefin copolymers (COC) are polymers that are produced by copolymerising ethene and cycloolefin and that are disclosed, for example, in the publication print EP 0 773 102 A1, which with reference is incorporated as part of the present explanation. It is characteristic of COC that it has good water vapour barrier properties; in addition, it is amorphous. Thus, neither post-crystallization nor curling caused by this occur in the extruded COC layer. As water vapour barrier it solves the above-mentioned problems related with HDPE used according to the state of the art.

The examples in the publication EP 0 773 102 A1 specifically describe cycloolefin copolymers, which are tetracyclic. In addition, commercial COC polymers manufactured by copolymerising ethene and norbornene are available, which have a high density and water vapour barrier properties at least similar to those of HDPE. The company Ticona GmbH manufacturing such COC reports its products to have the density of 1.02 $g/m^3$, the elasticity modulus of 2600-3500 $N/mm^2$, and the water permeability of 0.02-0.04 $g \cdot mm/m^2 \cdot 24$ hours. COC has been marketed as water vapour tight material for polymeric blister packages and packaging films, but as far as is known to the applicant, COC has not been used for fibre-based packaging materials, such as packaging paper and board, as water vapour barrier to be extruded according to the invention, the purpose of which is to avoid the curling problems of the previous materials.

The barrier layer containing COC can be attached in extrusion directly to the heat sealing layer of LDPE without it being necessary to apply a binding agent between the layers. COC as such is not heat-sealable, but it can be heat-sealed combined with LDPE. Further it has been noted in accordance with the invention that the COC barrier layer can in extrusion be attached to the fibre base likewise without the binding agent layer between them. Thus, the invention makes possible a packaging material embodiment, in which the one side of the fibre base is only provided with superimposed COC and heat sealing layers at the same time as the opposite side of the fibre base can be left totally without the polymer coating. The manufacture of a respective material by using HDPE as the water vapour barrier would not at all be possible, because of the curling problem. The material is useful for packages for dry products, in which the polymer layers come to the external surface of the packaging to protect the fibre base and the packed product from external moisture.

Alternatively, the invention can be advantageously applied by extruding the super-imposed COC and heat sealing layers to both sides of the fibre base of the packaging material. It is possible that the material has a symmetrical structure, in which case it can be applied to the folded package either way, without changing the other properties of the water vapour barrier or the package.

According to the invention, the water vapour layer can consist merely of COC or, alternatively, of a mixture of COC and some other polymer, such as LDPE. COC in itself is a relatively rigid polymer material, and by blending it with LDPE, it is possible to reduce the risk of ruptures impairing the vapour barrier when the packaging material is folded to packages.

According to the invention, the weight of the COC layer forming the water vapour barrier can be 5-50 $g/m^2$, preferably 7-30 $g/m^2$, and most preferably 10-20 $g/m^2$. The weight of the heat sealing layer, which is preferably made of LDPE, can be 5-50 $g/m^2$, preferably 5-30 $g/m^2$, and most preferably 7-20 $g/m^2$. By blending some other suitable polymer, such as polypropylene or polybutene, with LDPE in the heat sealing layer, it is possible to achieve a peeling joint sealing, i.e. a joint sealing, which opens when pulled apart.

At least one polymer layer forming an oxygen barrier can further be incorporated in the packaging material of the invention. When, for example, liquid foods are packed, the packaging material is typically folded so that the oxygen barrier comes to the interior of the fibre base. COC water vapour barrier layers can further be advantageously arranged to both sides of the material so that the fibre base and the oxygen barrier are left between two COC layers. The polymer layers inside the package then form the oxygen and water vapour barrier, which protects the packed product from the open air, and simultaneously, the fibre base of the packaging material from the packed product. The COC vapour barrier layer outside the package again protects the fibre base and the oxygen barrier from moisture penetrating from the outside and ensures that the package will keep its barrier properties during the preservation period required from it.

Suitable polymer materials forming the oxygen barrier are ethylene vinyl alcohol copolymer (EVOH), polyamide (PA), and the compounds of these. The weight of the oxygen barrier layer to be incorporated in the material can be 3-15 g/m2, preferably 5-10 g/m$^2$.

The packaging material to be manufactured according to the invention can be formed of packaging board (paperboard/cardboard), the weight of the fibre base of which can vary between 130 and 500 g/m$^2$, being most preferably 170-300 g/m$^2$. A three-layer board generally used, for example, in polymer-coated packaging boards is applicable as the fibre base, a thicker layer of chemi-thermomechanical pulp (CTMP) of the board being placed between two thinner layers of sulphate pulp. In addition, the invention covers the packaging papers, in which the weight of the fibre base is generally 20-120 g/m$^2$, preferably 40-100 g/m$^2$.

The sealed package according to the invention is formed by folding and heat sealing from some packaging material described above and manufactured according to the invention so that the exterior surface of the package will contain a water vapour barrier layer containing COC and an external heat sealing layer. In this way, above all, the moisture problem of the fibre base and the product, caused by moisture penetrating from the outside, has thus been solved in the package.

Further, the package of the invention advantageously comprises a second COC water vapour barrier layer and a possible polymeric oxygen barrier layer, which are left to the interior surface of the package inside the fibre base when the material is folded.

The package of the invention can especially be a carton or box package formed of polymer-coated board, or a bag package formed of polymer-coated paper. Especially dry and liquid foods can be mentioned as products to be packed.

Figure 13:
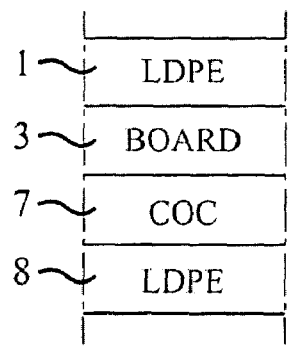
Figure 14:
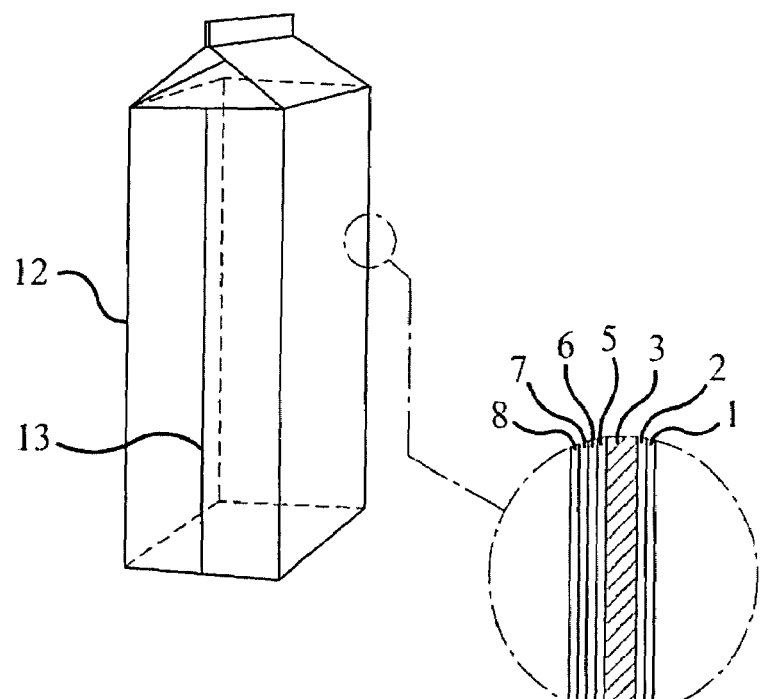
Figure 15:
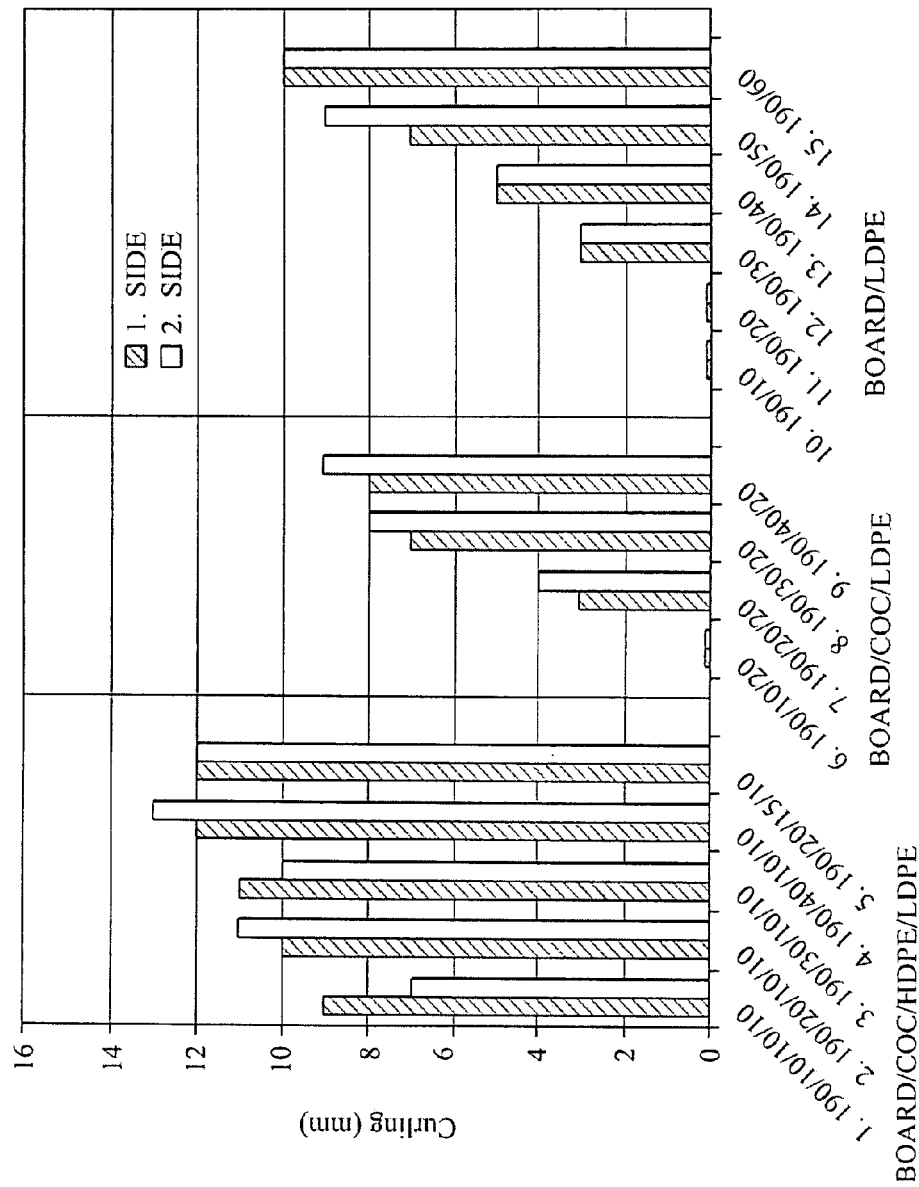

The invention is next explained in more detail with the help of examples, referring to the enclosed drawings, in which FIGS. 1-13 present the layer structures of the packaging materials of the invention as different embodiment alternatives, FIG. 14 presents a carton package of the invention, manufactured of packaging board by folding and heat sealing, and FIG. 15 is a diagram of the results of the curling measurements performed.

The polymer-coated packaging board shown in FIG. 1 comprises in the said order the LDPE heat sealing layer 1, the COC water vapour barrier layer 2, the fibre base 3, which is, for example, a three-layer board consisting of two sulphate pulp layers and a layer of chemi-thermomechanical pulp (GTMP) between them, the COC water vapour barrier layer 7, and the LDPE heat sealing layer 8. The LDPE and COC layers (1, 2; 7, 8) have been applied to both sides of the fibre base (3) in one step by coextrusion. The weight of the fibre base is, for example, 250 g/m$^2$, the weight of both the COC layers 2,7 is, for example, 15 g/m$^2$, and the weight of both the LDPE layers 1, 8 is, for example, 15 g/m$^2$. Thus, the board has a completely symmetrical structure so that either one of the LDPE layers 1, 8 can be the exterior surface of the package folded from board, and either one can be the interior surface. Due to the water vapour barrier on both sides, the board is especially suitable for the packaging of dry foods in countries, in which the climate is warm and damp.

Figure 2:
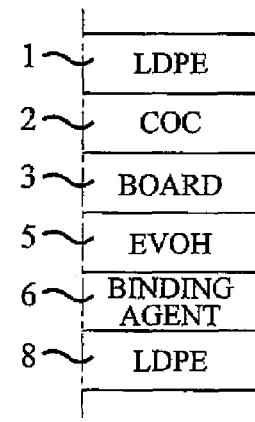

The packaging board in FIG. 2 comprises in the said order the LDPE heat sealing layer 1, the COC water vapour barrier layer 2, the fibre base 3, the EVOH oxygen barrier layer 5, the binding agent layer 6 of, for example, graft polyethylene, and the LDPE heat sealing layer 8. The superimposed coating layers (1, 2; 5, 6, 8) on both sides of the fibre base (3) are produced by coextrusion. The fibre base 3 can consist of the above-mentioned three-layer board, the weight of which is 250 g/m$^2$. The weight of the first LDPE layer and the COC layer 2 can be 15 g/m$^2$. The weight of the EVOH layer 5 can be, for example, 5 g/m$^2$, and the weight of the binding agent layer 6 can be 5 g/m$^2$ as well. The weight of the second LDPE layer 8 is, for example, 40 g/m$^2$. The board is meant to be folded to a package so that the first, thinner LDPE layer 1 will be the exterior surface of the package and the second, thicker LDPE layer 8 will be its interior surface so that the EVOH oxygen barrier layer 5 is left inside the fibre base 3 in the package. The board is usable for packages for dry or liquid foods, in which the COC layer 2 protects the inner surfaces of the material and, when required, the product from external moisture, and the EVOH layer 5 and the thicker LDPE layer 8 innermost in the package protect the product from oxidation and the fibre base 3 of the material from moistening caused by the product.

Figure 3:
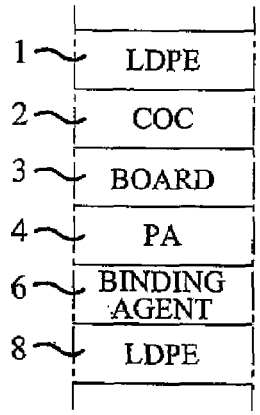

The packaging board according to FIG. 3 differs from the one shown in FIG. 2 only in that, instead of EVOH, the PA layer 4 is used as the oxygen barrier, the thickness of which is, for example, 7 g/m$^2$.

Figure 4:
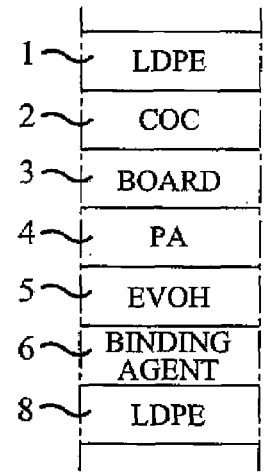

In FIG. 4, there is further shown an embodiment of the board of the invention, in which the oxygen barrier consists of superimposed PA and EVOH layers 4, 5. The weight of both these layers 4, 5 can be, for example, 5 g/m$^2$.

Figure 5:
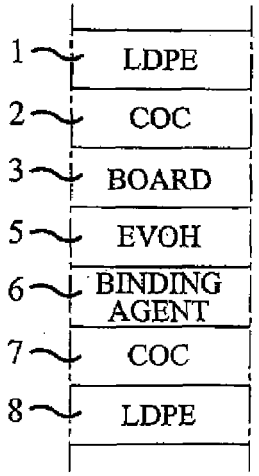

In FIG. 5, there is shown a packaging board, which comprises in the said order the LDPE heat sealing layer 1, the COC water vapour barrier layer 2, the fibre base 3, the EVOH oxygen barrier layer 5, the binding agent layer 6 of, for example, graft polyethylene, the COC water vapour barrier layer 7, and the LDPE heat sealing layer 8. The superimposed coating layers (1, 2; 5-8) on both sides of the fibre base (3) are produced by coextrusion. The fibre base 3 can be made of the above-mentioned three-layer board, and the weight of each of the LDPE and COC layers 1, 2, 7, 8 can be 15 g/m$^2$, and the weight of the EVOH and binding agent layers 5 g/m$^2$. The board is meant to be folded to a package so that the LDPE layer 1 mentioned first will be the exterior surface of the package and the LDPE layer 8 mentioned last will be the interior surface, in which case the EVOH layer 5 I left inside the fibre base 3 in the package. The board is especially suitable for the packaging of liquid foods, in which case the COC layers 2, 7 on both sides of the fibre base provide the necessary moisture protection for the other layers of the board at the same time as the EVOH layer 5 forms the oxygen barrier protecting the product.

Figure 6:
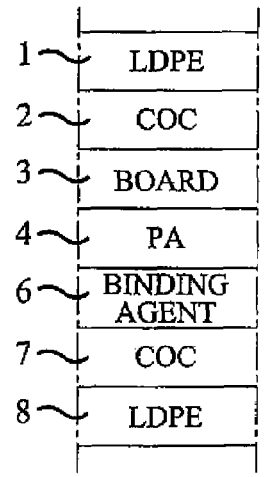
Figure 7:
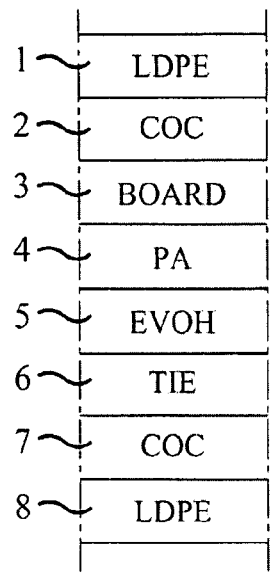

The packaging board shown in FIG. 6 differs from the one shown in FIG. 5 only in that, instead of EVOH, the PA layer 4 with the weight of, for example, 7 g/m$^2$ is used as the oxygen barrier. In FIG. 7, there is further shown an embodiment, in which the oxygen barrier consists of superimposed PA and EVOH layers 4, 5, the weight of both of which is, for example, 5 g/m$^2$.

Figure 8:
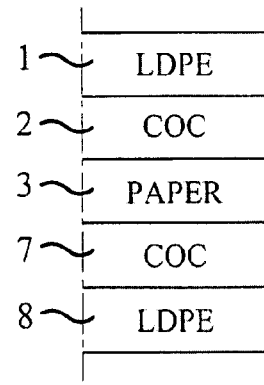

In FIG. 8, there is shown a packaging material according to the invention, which differs from the one shown in FIG.

1 only in that, instead of the three-layer board, the packaging paper 3' with the weight of, for example, 80 g/m², is used as the fibre base.

Figure 9:
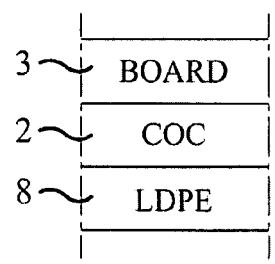

FIG. 9 discloses an embodiment of the invention, in which polymeric coating layers consisting of the COC water vapour barrier layer 7 and the outer LDPE heat sealing layer 8 are extruded only to one side of the fibre base 3. In other words, the other side of the fibre base 3 is left without the polymer coating. The fibre base 3 can be made of the above-mentioned three-layer board consisting of sulphate and CTMP layers. Upon folding the packaging board 9 to a package, the polymeric coating layers 7, 8 can be as well the exterior surface as to the interior surface of the package.

Figure 10:
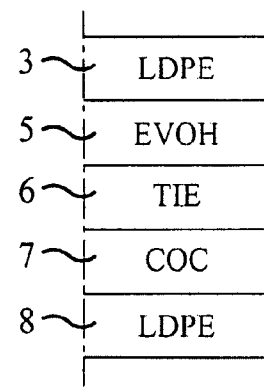
Figure 11:
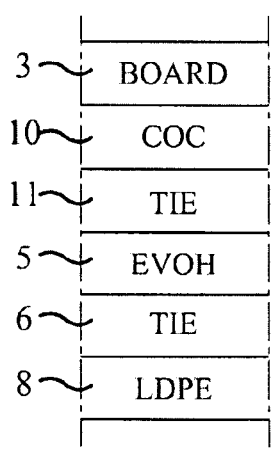

The packaging board according to FIG. 10 comprises the fibre base 3, which is extrusion-coated with the EVOH layer 5, the binding agent layer 6, the COC layer 7, and the LDPE heat sealing layer 8, in the said order. The one side of the fibre base 3 is left without the coating. In FIG. 11, there is further shown a packaging board coated from one side, in which the fibre base 3 has as a coating the COC layer 10, the binding agent layer 11, the EVOH layer 5, the binding agent layer 6, and the LDPE layer 8, in the said order. In the embodiments in FIGS. 10 and 11, the extruded COC water vapour barrier layers 7, 10 do not curl the board, unlike the HDPE water vapour barrier. In both the embodiments, the superimposed coating layers are meant to remain inside the fibre base 3 upon folding the package. In the structure in FIG. 11, the COC layer 10 then protects the EVOH oxygen barrier layer 5 from moisture penetrating from the outside of the package.

Figure 12:
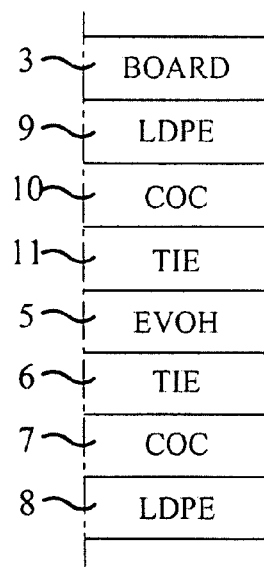

In FIG. 12, there is shown a packaging board, in which the one side of the fibre base 3 is provided with an coextruded coating layer combination, consisting of the LDPE layer 9, the COC layer 10, the binding agent layer 11, the EVOH layer 5, the binding agent layer 6, the COC layer 7 and the LDPE layer 8 in the said order. The fibre base 3 excluded, the layer structure is symmetrical, with which advantage is achieved in the simultaneous extrusion of the layers. Further, in this structure, the COC layers 10, 7 protect the EVOH oxygen barrier layer 5 from moisture penetrating from both directions. The use of HDPE would make this structure unusable, due to its strong tendency to curl.

In the embodiments according to FIGS. 10-12, the EVOH oxygen barrier layer 5 can be replaced by a polyamide layer, or EVOH and polyamide layers placed against each other can act as the oxygen barrier, as in the structure shown in FIG. 7.

The embodiment according to FIG. 13 comprises on the one side of the fibre base 3 the coextruded COC and LDPE layers 7, 8 corresponding to FIG. 9, and the mere LDPE layer 1 on the opposite side. Upon folding the packaging board according to FIG. 13, the COC layer 7 can as well be on the exterior of the fibre base 4 as on the interior, depending on the protection need of the product and the fibre base of any given time. Due to the amorphosity of the COC, the material has no tendency to curl.

In FIG. 14, there is seen an example of the carton package 12 of the invention, which is formed by folding and heat sealing from a packaging blank made of the packaging board according to FIG. 12. The board is located in the package 12 so that the exterior surface of the package outside the fibre base 3 is provided with superimposed COC and LDPE layers 2, 1 so that the four-layer coating 5-8 containing the EVOH layer 5 remains inside the fibre base 3 in the package. At the joints 13 of the package 12, the edges of the blank have been made to overlap, and the LDPE layers 1, 8 of the opposite surfaces of the board have been heat sealed tightly to each other.

The following examples further disclose the tests performed with the new packaging boards of the invention. The COC used in the tests was TOPAS 8007 D 50, a product marketed by TICONA GmbH.

Example 1

Heat Sealability of Board

The adhesiveness of COC to board and LDPE and the behaviour in heat sealing was tested by manufacturing a polymer-coated board corresponding to FIG. 9, in which the weight of the cup board forming the fibre base 3 was 210 g/m², and the weight of both the coating layers 7, 8 on it was 10 g/m². No problems occurred in the adhesion of the COC and LDPE layers 7, 8 to each other and to the fibre base 3. Further, a coated board was manufactured for the heat sealing tests, in which only one LDPE layer with the weight of 18 g/m² was provided on the same cup board base. In the tests, these two coated boards were heat sealed to one another in different circumstances, the LDPE layers against each other. The results of the tests have been shown in the following Table 1.

TABLE 1

| | ADHESIVENESS (%) IN TEMPERATURE | | | |
|---|---|---|---|---|
| Jointing time (s) | 200° C. | 225° C. | 250° C. | 275° C. |
| 0.5 | 25% | 25-50%, soft | 50%, not tight | 25% |
| 1.0 | 50% | 50-75%, soft | 50-75%, not tight | 25-50% |
| 2.0 | 75% | 100%, not tight | 75-100%, not tight | 100%, not tight |

According to the table, the jointing times were 0.5, 1.0 or 2.0 seconds, and the jointing temperature was 200, 225, 250 of 275° C. The pressure used in the jointing was 0.8 N/mm². It is seen from the results that with the jointing times of 0.5 and 1.0 seconds, the jointing was insufficient in all the tested jointing temperatures. With the jointing time of 2.0 seconds, however, the complete (100%) jointing was achieved in the temperatures of 225 and 275° C. The result shows that by increasing the jointing time, a tight, leak proof heat sealed joint can be achieved. It is apparent that the jointing can be made faster by increasing the jointing pressure.

Example 2

Curling of the Board

Three different series of packaging boards were manufactured for the tests, in which the cup board with the weight of 190 g/m² was extrusion-coated (1) with one single LDPE layer, the weight of which varied between 10 and 60 g/m²; (2) with a COC layer and an outer LDPE layer so that the weight of the COC layer varied between 10 and 40 g/m², and the weight of the LDPE layer was in each case 20 g/m²; and (3) with a three-layer structure consisting of a COC layer, HDPE layer and LDPE layer, in which the weight of the COC layer varied between 10 and 40 g/m²; the weight of the HDPE layer was 10 or 15 g/m², and the weight of the LDPE layer was in each case 10 g/m². The curls were measured from disc-shaped test pieces from their opposite sides according to the ISO 11556 standard. The results can be seen in the enclosed FIG. 15.

When comparing the curling of board coated with COC and LDPE layers to boards coated with LDPE only it can be seen that COC does not add curling, compared with LDPE, but rather reduces it when the total amount of the coating polymers being the same. Whereas in a case in which the coating combination also contained an HDPE layer, the board curled noticeably more. Considering the non-curling of the material, the advantageousness of COC as a water vapour barrier polymer replacing HDPE is apparent on the basis of the tests.

Example 3

Permeation of Water Vapour

The water vapour permeation (WVTR) was measured from a series of polymercoated packaging boards comprising the COC layer at a temperature of 38° C. in the relative humidity of 90%. A cup board with the weight of 190 g/m$^2$ was in each case used as the fibre base 3, and extruded multi-layer coatings included, besides COC, a blend of COC and LDPE, high density (HD) and medium density (MD) HDPE and LDPE in layers of different thickness.

The researched structures, in which the numerical values are layer weights (g/m$^2$), and the measured water vapour permeations (g/m$^2$/d) were according to the following Table 2.

For reference, the water vapour permeation values from a few boards coated with HDPE/LDPE, which do not contain COC (base boards 190, 250 and 270 g/m$^2$), have been included in the table.

TABLE 2

| Layer structure | WVTR (g/m$^2$/d) |
|---|---|
| Board 190 + COC 10 + HDPE (HD) 10 + LDPE 10 | 6.59 |
| Board 190 + COC 40 + HDPE (HD) 10 + LDPE 10 | 2.79 |
| Board 190 + COC 10 + LDPE 20 | 8.37 |
| Board 190 + COC 40 + LDPE 20 | 3.03 |
| Board 190 + LDPE 10 + COC 10 + LDPE 10 | 6.70 |
| Board 190 + LDPE 10 + COC 40 + LDPE 10 | 3.21 |
| Board 190 + COC blend 10 + HDPE (MD) 10 + LDPE 10 | 7.18 |
| Board 190 + COC blend 40 + HDPE (MD) 10 + LDPE 10 | 2.21 |
| Reference materials: | |
| Board 190 + LDPE 10 + HDPE 20 + LDPE 10 | 5.8 |
| Board 250 + HDPE 20 + LDPE 10 | 7.8 |
| Board 270 + HDPE 40 + LDPE 10 | 4.6 |

It can be seen from the results that the water vapour barrier properties of COC are at least equivalent to those of HDPE, and it is usable as such or blended with LDPE.

It is obvious for one skilled in the art that the embodiment possibilities of the invention are not restricted to those shown as examples above, but they can vary within the scope of the enclosed patent claims.

The invention claimed is:

1. Method for manufacturing a heat-sealable packaging material, in which superimposed polymeric coating layers are extruded onto a fibre base, the said layers comprising an outer polymeric heat sealing layer and at least one inner polymeric barrier layer the water vapour penetration of which is lower than that of the heat sealing layer, wherein cycloolefin copolymer (COC) is incorporated in the inner polymeric barrier layer so that the extrusion produces an amorphous layer without post-crystallisation occurring in the polymer and wherein the inner polymeric barrier layer is adhered directly to the fibre base without a binding agent between the inner polymeric barrier layer containing COC and the fibre base.

2. Method according to claim 1, characterised in that the superimposed coating layers placed against each other are brought onto the fibre base in one step by coextrusion.

3. Method according to claim 1, characterised in that the barrier layer containing COC is adhered directly to the heat sealing layer without a binding agent between them.

4. Method according to claim 1, characterised in that only one side of the fibre base is coated with polymer.

5. Method according to claim 1, characterised in that the fibre base is on both sides provided with a heat sealing layer and an inner barrier layer containing COC.

6. Method according to claim 1, characterised in that the barrier layer is formed in its entirety of COC.

7. Method according to claim 1, characterised in that the barrier layer is formed of a mixture of COC and low-density polyethylene (LDPE).

8. Method according to claim 1, characterised in that the weight of said at least one inner polymeric barrier layer containing COC is 5-50 g/m$^2$.

9. The method of claim 8, wherein the weight of said at least one inner polymeric barrier layer containing COC is 7-30 g/m$^2$.

10. The method of claim 9, wherein the weight of said at least one inner polymeric barrier layer containing COC is 10-20 g/m$^2$.

11. Method according to claim 1, characterised in that the material of the heat sealing layer is low-density polyethylene (LDPE).

12. Method according to claim 11, characterised in that the weight of the LDPE heat sealing layer is 5-50 g/m$^2$.

13. The method of claim 12, wherein the weight of the LDPE heat sealing layer is 5-30 g/m$^2$.

14. The method of claim 13, wherein the weight of the LDPE heat sealing layer is 7-20 g/m$^2$.

15. Method according to claim 1, characterised in that at least one oxygen barrier layer is incorporated in the polymer coating.

16. Method according to claim 15, characterised in that one side of the fibre base is provided with a water vapour barrier layer containing COC and an outer heat sealing layer, and the opposite side is provided with an oxygen barrier layer and an outer heat sealing layer.

17. Method according to claim 16, characterised in that one side of the fibre base is provided with a water vapour barrier layer containing COC and an outer heat sealing layer, and the opposite side is provided with an oxygen barrier layer, a water vapour barrier layer containing COC, and an outermost heat sealing layer.

18. Method according to claim 15, characterised in that the oxygen barrier layer is formed of ethyl vinyl alcohol copolymer (EVOH), polyamide (PA), or a mixture of these.

19. Method according to claim 18, characterised in that the weight of the oxygen barrier layer is 3-15 g/m$^2$.

20. The method of claim 19, wherein the weight of the oxygen barrier layer is 5-10 g/m$^2$.

21. Method according to claim 1, characterised in that a packaging board is manufactured, the weight of the fibre base of which is 130-500 g/m$^2$.

22. The method of claim 21, wherein a packaging board is manufactured, the weight of the fibre base of which is 170-300 g/m².

23. Method according to claim 1, characterised in that a packaging paper is manufactured, the weight of the fibre base of which is 20-120 g/m².

24. The method of claim 23, wherein a packaging paper is manufactured, the weight of the fibre base of which is 40-100 g/m².

25. A method for manufacturing a heat-sealable packaging material, in which superimposed polymeric coating layers are extruded onto both sides of a fiber base, the superimposed layers on both sides of the fiber base comprising an outer polymeric heat-sealing layer and at least one inner polymeric barrier layer the water vapor penetration of which is lower than that of the outer heat-sealing layer, wherein said at least one inner polymeric barrier layer on both sides of the fiber base incorporates cycloolefin copolymer (COC) so that the extrusion produces an amorphous layer without post-crystallization occurring in the polymer and wherein both of said inner polymeric barrier layers are adhered directly to the fiber base without a binding agent between either of said inner polymeric barrier layers and the fiber base.

* * * * *